Sept. 2, 1958  C. B. CARLBERG  2,850,057
SAW CHAINS
Filed Dec. 17, 1956
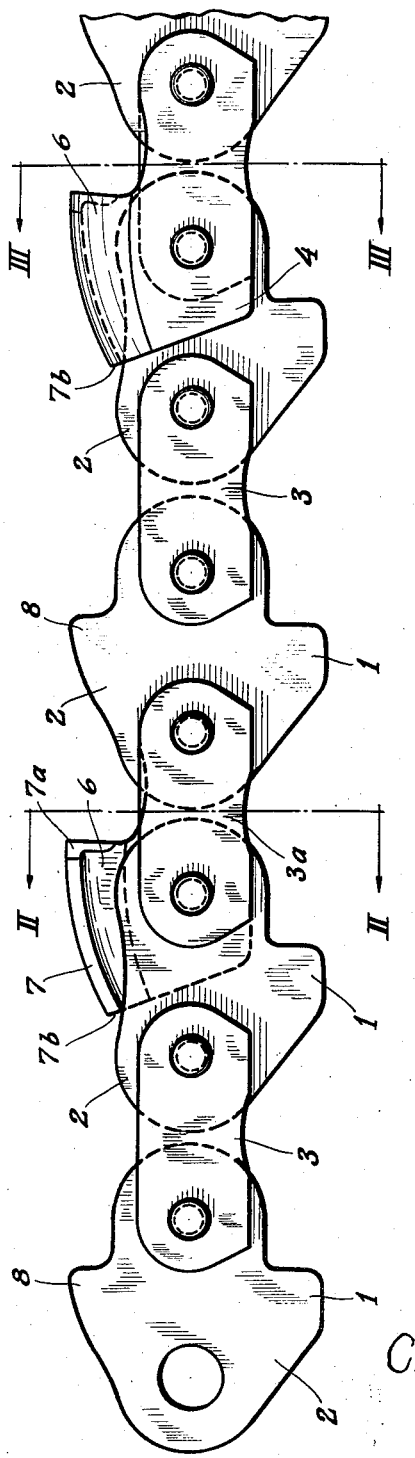
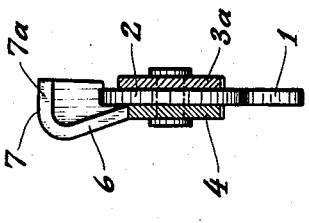
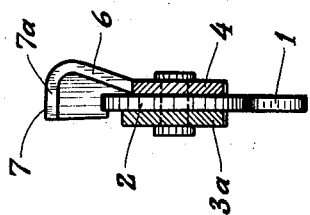
INVENTOR
CLAS BERTIL CARLBERG
BY Linton and Linton
ATTORNEYS

United States Patent Office 2,850,057
Patented Sept. 2, 1958

2,850,057

SAW CHAINS

Clas Bertil Carlberg, Molndal, Sweden, assignor to Aktiebolaget Bergborrmaskiner, Molndal, Sweden Application December 17, 1956, Serial No. 628,836

Claims priority, application Sweden February 1, 1956

1 Claim. (Cl. 143—135)

The present invention relates to saw chains in which the links carrying the cutter teeth are arranged along the chain alternately at side one and at the other side of the longitudinal middle plane of the chain. More particularly, the invention relates to cutter teeth for such chains of the type having an upper portion bent at approximately right angles to the tooth link and extending laterally of the chain.

The object of the invention is to provide an improved saw chain which will run more smoothly and steadily and which will be subject to less wear than hitherto known chains of the kind in question.

Another and more specific object of the invention resides in the provision of a cutter tooth for saw chains which will make it possible to cut through or perforate a piece of wood by pushing the outer end of the saw bar straight into the wood. This procedure is of great importance for instance in demolishing buildings. It will be obvious that a wooden wall or the like may be cut down rapidly and easily with the use of a chain saw which can be pushed straight into the side of the wall like a sword.

With the above objects in view, the invention consists essentially in a saw chain of the kind stated above in which the upper bent portion of the cutter teeth is curved in longitudinal direction of the chain, the curvature extending all the way to the cutter edge of the tooth.

According to a preferred embodiment of the invention the curved portion of the cutter tooth is of arcuate shape.

The invention will be more fully described with reference to the accompanying drawings, in which:

Figure 1 is a side elevation of a portion of a saw chain provided with cutter teeth according to the invention;

Figure 2 is a section taken on the line II—II in Figure 1, and

Figure 3 is a section along the line III—III in Figure 1.

The saw chain is composed of drive links 2 provided with drive teeth 1 for engaging a drive sprocket on the saw bar (not shown). The drive links 2 are interconnected by means of pairs of connecting links 3, of which alternate pairs consist of identical links 3 and alternate pairs consist of one connecting link 3a and a tooth link 4. The tooth links are arranged along the chain at alternate sides of the driving links 2. The cutter teeth of the tooth links comprise a portion 6 which extends upwards at a slight angle to the link and a bent portion 7 which extends laterally of the chain and which is curved in longitudinal direction of the chain. When the chain is straightened the rear edge 7b of the tooth portion 7 abuts against the upper edge of the succeeding link 2.

The driving links 2 situated immediately in front of each tooth link (according to Figure 1 the chain runs from left to right) is provided with a rider 8, the upper edge of which is situated somewhat below the cutting edge 7a of the cutter teeth. The rider 8 limits the depth of the cut and simultaneously removes cutter chips from the cut groove. As is shown in Figures 2 and 3, the portions 7 of the cutter teeth extend laterally past the longitudinal middle plane of the chain.

When piercing a wooden wall or the like, the free end of the saw bar around which the chain runs is pushed straight into the wood and breaks through the same. Hitherto known chains have the drawback that as the chain passes around a roller at the free end of the saw bar, the rear edge of the cutter teeth will follow a path outside the path of the cutting front edge of the teeth, whereby the efficiency of the chain is considerably decreased.

This drawback is eliminated by the use of cutter teeth having a curved edge portion 7 according to the invention.

A further advantage of the curved portion 7 of the cutter tooth is that a smaller angle of clearance is obtained immediately behind the cutter edge 7a which facilitates a smooth running of the chain.

What I claim is:

In a saw chain having a plurality of tooth links arranged at alternate sides of the longitudinal middle plane of the chain pivotally joined to drive links, an improvement in said tooth links comprising a cutter tooth provided on each tooth link having an upper portion bent at approximately right angles to its tooth link and extending laterally of said chain, said cutter tooth having a leading cutter edge, said cutter tooth bent portion being of an arcuate configuration in a longitudinal direction of said chain, said bent portion of said tooth having the curvature thereof extending all the way therealong from said cutter edge of said tooth inwardly of said chain whereby said cutter tooth bent portion abuts against the succeeding drive link of said chain when said chain is in a straightened position.

References Cited in the file of this patent

UNITED STATES PATENTS

| 2,316,997 | Smith | Apr. 20, 1943 |
| 2,508,784 | Cox | May 23, 1950 |
| 2,638,944 | Woleslagle | May 19, 1953 |
| 2,788,811 | Bernard et al. | Apr. 16, 1957 |

FOREIGN PATENTS

| 756,690 | France | Sept. 25, 1933 |
| 485,958 | Italy | Oct. 22, 1953 |